(12) United States Patent
Mastbergen (10) Patent No.: US 8,484,956 B2
(45) Date of Patent: Jul. 16, 2013

(54) DIESEL PARTICULATE FILTER REGENERATION CONTROL USING A WIDE BAND OXYGEN SENSOR

(75) Inventor: Daniel B. Mastbergen, Loveland, CO (US)

(73) Assignee: Woodward, Inc., Fort Collins, CO (US)

(*) Notice: Subject to any disclaimer, the term of this patent is extended or adjusted under 35 U.S.C. 154(b) by 416 days.

(21) Appl. No.: 13/023,040

(22) Filed: Feb. 8, 2011

(65) Prior Publication Data

US 2011/0197567 A1    Aug. 18, 2011

Related U.S. Application Data

(60) Provisional application No. 61/303,902, filed on Feb. 12, 2010.

(51) Int. Cl.
*F01N 3/023* (2006.01)
(52) U.S. Cl.
USPC ............. 60/295; 60/274; 60/276; 60/286; 60/297; 60/300; 60/303; 60/311; 60/320
(58) Field of Classification Search
USPC .............. 60/274, 276, 286, 295, 297, 300, 60/303, 311, 320
See application file for complete search history.

(56) References Cited

U.S. PATENT DOCUMENTS

| 2003/0113249 | A1* | 6/2003 | Hepburn et al. | 423/242.1 |
| 2008/0120962 | A1* | 5/2008 | Okugawa et al. | 60/274 |
| 2008/0264036 | A1* | 10/2008 | Bellovary | 60/274 |
| 2011/0073088 | A1* | 3/2011 | Hubbard et al. | 123/703 |
| 2011/0107741 | A1* | 5/2011 | LaRose et al. | 60/276 |

* cited by examiner

*Primary Examiner* — Thomas Denion
*Assistant Examiner* — Jorge Leon, Jr.
(74) *Attorney, Agent, or Firm* — Reinhart Boerner Van Deuren P.C.

(57) ABSTRACT

A regeneration control system for use with a diesel engine having a diesel particulate filter is provided. This regeneration control system utilizes a wide band oxygen sensor placed in the exhaust stream upstream of a regeneration device, as well as an engine speed sensor, to determine when to initiate the regeneration event, and for controlling the regeneration device to ensure proper regeneration of the diesel particulate filter. The after treatment controller utilizes the oxygen percentage signal to calculate or otherwise determine the percentage load at which the diesel engine is operating. This information along with the engine speed information allows the after treatment controller to calculate or otherwise determine exhaust parameters necessary for proper control of the regeneration device.

20 Claims, 7 Drawing Sheets

DIESEL PARTICULATE FILTER REGENERATION CONTROL USING A WIDE BAND OXYGEN SENSOR

CROSS-REFERENCE TO RELATED PATENT APPLICATIONS

This patent application claims the benefit of U.S. Provisional Patent Application No. 61/303,902, filed Feb. 12, 2010, the entire teachings and disclosure of which are incorporated herein by reference thereto.

FIELD OF THE INVENTION

This invention generally relates to diesel particulate filter regeneration systems, and more particularly to control systems for initiating and controlling the regeneration process for a diesel particulate filter.

BACKGROUND OF THE INVENTION

Increasing environmental restrictions and regulations are causing diesel engine manufacturers and packagers to develop technologies that improve and reduce the impact that operation of such engines have on the environment. As a result, much design work has gone into the controls that operate the combustion process within the engine itself in an attempt to increase fuel economy and reduce emissions such as $NO_x$ and particulates. However, given the operating variables and parameters over which a diesel engine operates and given the tradeoff between $NO_x$ and particulate generation, many engine manufacturers and packagers have found it useful or necessary to apply exhaust after-treatment devices to their systems. These devices are used to filter the exhaust gas flow from the diesel engine to remove or reduce to acceptable levels certain emissions. Such devices are particularly useful in removing exhaust particulates, or soot, from the exhaust gas flow before such soot is released into the environment.

One such exhaust after-treatment device is called a Diesel Particulate Filter (DPF). The DPF is positioned in the exhaust system such that all exhaust gases from the diesel engine flow through it. The DPF is configured so that the soot particles in the exhaust gas are deposited in the filter substrate of the DPF. In this way, the soot particulates are filtered out of the exhaust gas so that the engine or engine system can meet or exceed the environmental regulations that apply thereto.

While such devices provide a significant environmental benefit, as with any filter, problems may occur as the DPF continues to accumulate these particulates. After a period of time, the DPF becomes sufficiently loaded with soot such that the exhaust gases experience a significant pressure drop passing through the increasingly restrictive filter. As a result of operating with an overly restrictive filter, the engine thermal efficiency declines because the engine must work harder and harder simply to pump the exhaust gases through the loaded DPF. Besides the reduced thermal efficiency, a second and potentially more dangerous problem may occur. Because the soot accumulated in the DPF is flammable, continued operation with a loaded DPF raises the serious potential for uncontrolled exhaust fires if, and when, the accumulated soot is eventually ignited and burns uncontrollably.

To avoid either occurrence, one of several possible filter heating devices is typically incorporated upstream of the DPF to periodically clean the filter. These filter heating devices are used periodically to artificially raise the temperature of the exhaust stream to a point at which the accumulated soot will self-ignite. When initiated at a time before the soot loading of the DPF becomes excessive, the ignition and burn-off will occur in a safe and controlled fashion. This process of burning the soot in such a controlled manner is called regeneration. The control of the method to generate the supplemental heat necessary to increase the temperature in the DPF is critical to safe and reliable regeneration. Typically, the acceptable temperature range for active regeneration is from 500 to 700° C. Temperatures below this range are insufficient to ignite the accumulated soot, and temperatures above this range may cause thermal damage to the filter media.

Many methods have been devised to provide the auxiliary heat necessary to initiate regeneration. For example, the operating parameters of the diesel engine may be modified in such a manner to cause the exhaust temperature to rise to a level sufficient for proper operation of the downstream particulate filter. It is also possible to inject hydrocarbon fuel into the exhaust of a diesel engine immediately before the exhaust passes through a diesel oxidation catalyst (DOC) positioned upstream of the particulate filter. The DOC converts the excess hydrocarbon fuel into heat by means of the catalytic reaction of the catalyst, thus increasing the exhaust gas temperature prior to its passage through the particulate filter. Supplemental heat may also be generated in the exhaust flow by use of an auxiliary electrical heater, or a microwave heater, placed within the exhaust path. This supplemental heat is added to the exhaust gas prior to its passage through the particulate filter. As an alternative to the use of a microwave or electric heater, another method of filter regeneration uses a fuel-fired burner to heat the exhaust gas prior to the DPF. Such a burner requires a diesel fuel supply, an auxiliary air supply, and an ignition system.

The rate at which soot accumulates in the filter depends primarily upon the operating regime of the engine. As such, besides the selection of the particular method or device to be used to heat the exhaust gas to enable regeneration, the engine manufacturer or packager must also determine when to initiate the regeneration process. If regeneration is initiated too soon, when the DPF is only lightly loaded, the process will be inefficient. If the regeneration is not initiated until the DPF is heavily loaded, the overall engine efficiency would have been unduly reduced as discussed above, and there is a risk that the soot may self-ignite and/or that the burn may be unsafe and uncontrolled.

In an attempt to properly determine when to initiate the regeneration process, several sensors and control algorithms have been developed. These sensors and control algorithms may be used to estimate the soot loading of the DPF so that regeneration can be initiated only after soot loading could cause an engine efficiency reduction but before excessive loading occurs that would actually result in such an efficiency reduction and increased potential for self-ignition. The engine operating data from an engine control unit (ECU) and other sensor data used by such regeneration controllers is typically relayed on an engine controller-area network (CAN) bus. Such data includes engine load, fuel consumption, exhaust flow, and various system temperatures and pressures. Using this data, current regeneration control systems are able to properly initiate and control the regeneration process.

Unfortunately, such engine operating data and other sensor data may not be available to the regeneration controller. This may be because the engine is mechanically governed, as opposed to electronically controlled by an ECU. This lack of information may also be because the regeneration system is a retrofit application on an existing engine for which such CAN or other fuel rack information is not accessible to the regeneration controller. Regardless of the cause for the lack of engine operating data, the regeneration controller still must properly initiate and control the regeneration process for all of the same reasons discussed above.

There is a need, therefore, for a regeneration system for a diesel particulate filter that can properly determine when to initiate regeneration and that can control the regeneration process once initiated without CAN or other fuel rack information. Embodiments of the present invention provides such a regeneration control system. These and other advantages of the invention, as well as additional inventive features, will be apparent from the description of the embodiments of the invention provided herein.

BRIEF SUMMARY OF THE INVENTION

In view of the above, embodiments of the present invention provide a new and improved regeneration control system for a diesel particulate filter. More particularly, embodiments of the present invention provide a new and improved regeneration system for a diesel particulate filter that provides proper initiation and control of the regeneration process without requiring engine operating data from an engine control unit or other sensor data relayed on a CAN bus. More particularly, embodiments of the present invention provide a new and improved regeneration control system that is able to properly initiate and control the regeneration process for electronically controlled diesel engines and mechanically governed diesel engines for both OEM and retrofit applications.

In one embodiment, the regeneration control system includes an after treatment controller that receives an oxygen percentage signal from a wide band oxygen sensor placed upstream of a regeneration device used to initiate the regeneration of the diesel particulate filter. Preferably, the after treatment controller also includes an engine speed sensor that determines the engine speed in revolutions per minute (RPM). The after treatment controller is programmed to calculate the engine load through a transfer function of the oxygen percentage signal. This information is used in one embodiment along with the speed information to estimate soot production and soot loading in the diesel particulate filter. In such an embodiment, the use of the oxygen sensor allows the after treatment controller to calculate the engine and exhaust information required for proper initiation and control of the regeneration process without disrupting the engine, fuel pump, CAN messaging, or other intrusive methods.

In an embodiment of the present invention, the regeneration control system also includes a delta pressure sensor positioned to monitor a delta pressure across the DPF. In such an embodiment, the aftertreatment controller is programmed to determine total soot loading from the $O_2$% information, from the engine speed information, and from the delta pressure across the DPF. The aftertreatment controller controls the regeneration device to initiate regeneration when the total soot loading exceeds a predetermined threshold.

As such, embodiments of the present invention are particularly well suited to after market and retrofit applications of existing diesel engines. Embodiments of the present invention are also particularly well suited to mechanically governed engines that do not typically employ CAN messaging or other fuel rack information. The oxygen sensor can be installed in the exhaust pipe upstream of the regeneration device in the diesel particulate filter with very little impact to the exhaust system, and allows the after treatment controller to properly estimate load and soot production.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
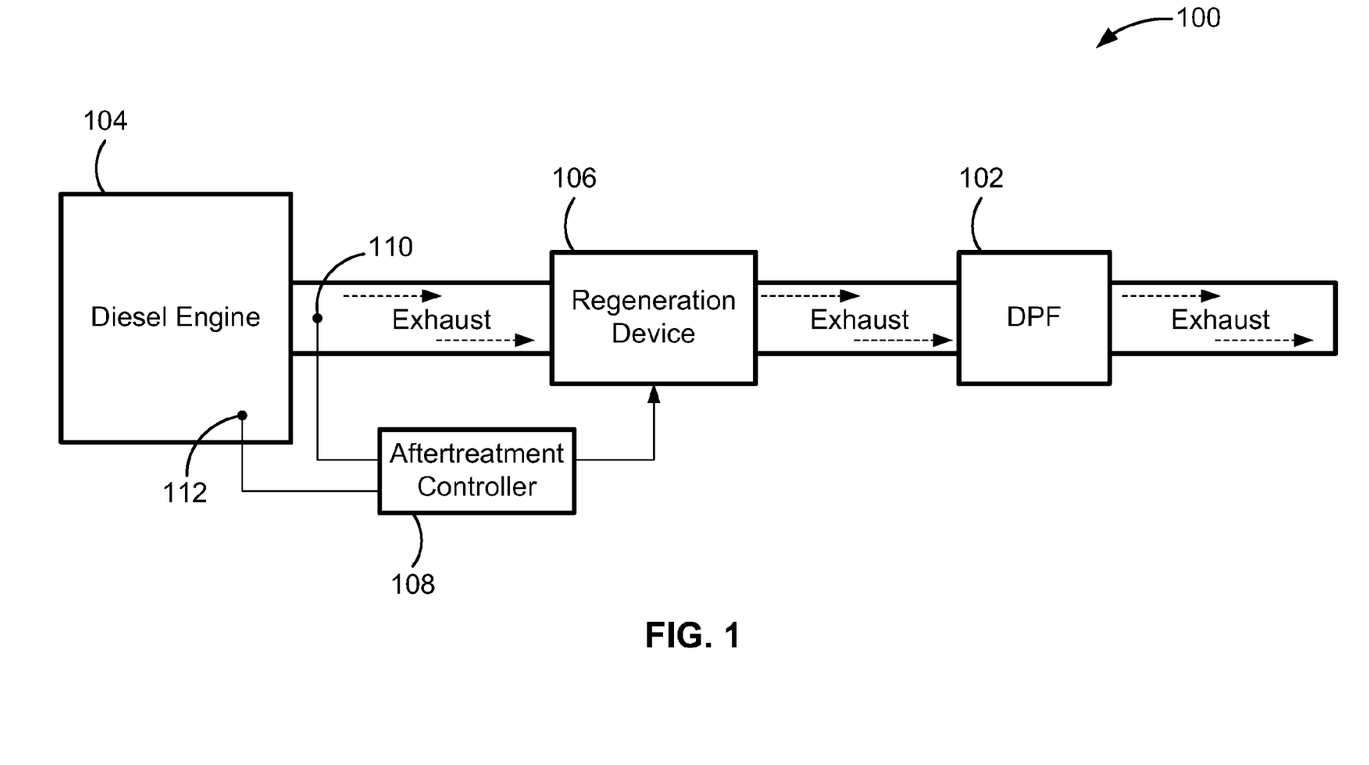
FIG. 1 is a simplified schematic illustration of a diesel engine exhaust system including a diesel particulate filter, and including an embodiment of a regeneration control system constructed in accordance with the teachings of the present invention.

Turning now to the drawings, there is illustrated in FIG. 1 a simplified schematic diagram of a diesel engine exhaust system 100 that utilizes a diesel particulate filter 102 as an after treatment device to filter the exhaust gas from the diesel engine 104 to remove or reduce to acceptable levels certain emissions such as exhaust particulates or soot. While the following description will utilize this operating environment, it should also be noted that the system and methods described below may also be applied to other aftertreatment systems, such as those dealing with NOx emissions that also require exhaust flow and composition data for control strategies. An example of such as system is a Selective Catalytic Reduction (SCR) system that uses a reductant to treat NOx emissions. As such, the following should be taken by way of example and not by way of limitation.

In the system shown in FIG. 1, a regeneration device 106, is also included in the exhaust stream between the diesel engine 104 and the diesel particulate filter 102 to provide regeneration of the diesel particulate filter 102 under control of the after treatment controller 108. Unlike prior after treatment controllers, the after treatment controller 108 requires only a oxygen percentage signal of the exhaust from the diesel engine 104 as sensed by a wide band oxygen sensor 110 installed upstream of the regeneration device 106. In a preferred embodiment, an engine speed signal sensed by engine speed sensor 112 is also provided to the after treatment controller 108 to allow proper determination of an initiation point for the regeneration of the diesel particulate filter 102 and proper control thereof once initiated.

Figure 2:
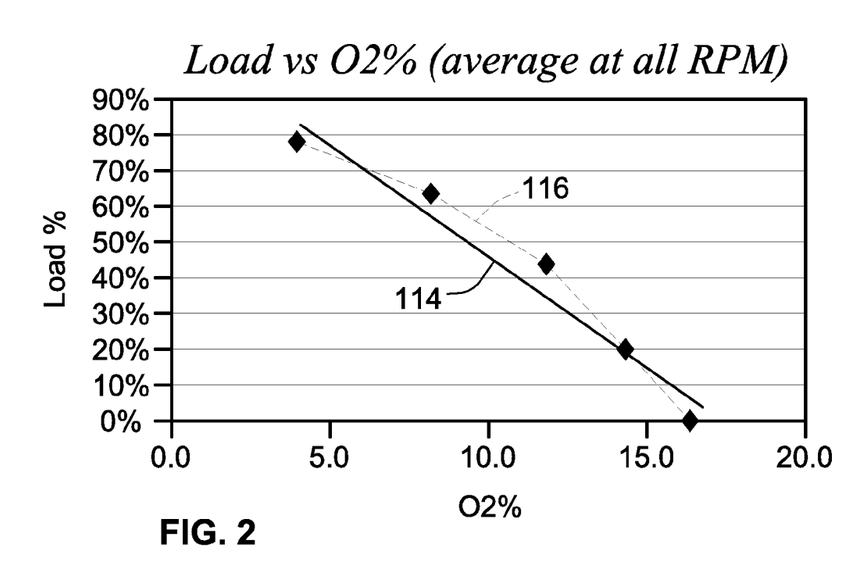
FIG. 2 is a graphical illustration of engine load percentage versus oxygen percentage.

Specifically, the after treatment controller 108 utilizes a transfer function that allows it to calculate load percentage of the diesel engine 104 based solely on the oxygen percentage signal sensed by the oxygen sensor 110. This transfer function utilized by the after treatment controller 108 may take various forms in different embodiments of the present invention. As illustrated in FIG. 2, the after treatment controller 108 utilizes a linear approximation shown by line 114 of the actual load versus oxygen percentage data, averaged for all engine operating speeds, illustrated by trace 116. Such a linear approximation simplifies the processing of the oxygen percentage information as may be used in a cost effective approach. However, it will be recognized by those skilled in the art that other transfer functions more closely approximating the actual empirical relationship observed for a particular engine utilizing higher order equations may also be implemented. In other embodiments of the after treatment controller 108 of the present invention, a mapping or look up table may be implemented that includes discrete data points of the empirical observed data of load percentage versus oxygen percentage. Such an implementation may remove any requirement for calculation, or may reduce the amount of calculation to interpolation between discrete data points stored in the map or look up table.

Once the engine load is determined by the after treatment controller 108, this information may be used to approximate exhaust flow and temperature for control of the regeneration device 106. For example, in an embodiment that utilizes a burner as the regeneration device 106, the after treatment controller 108 can utilize the load percentage information calculated from the oxygen signal for nozzle control in the burner.

Figure 3:
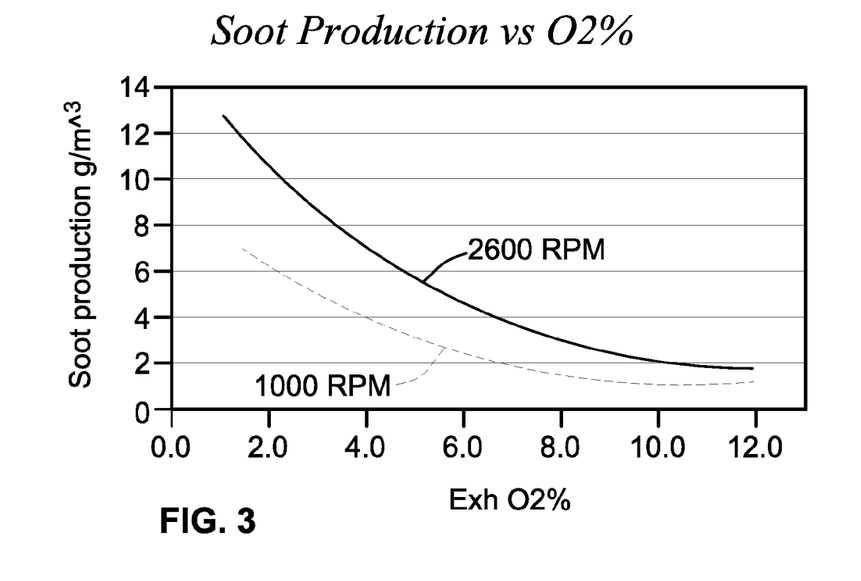
FIG. 3 is a graphical illustration of soot production versus oxygen percentage at various engine speeds.
Figure 5:
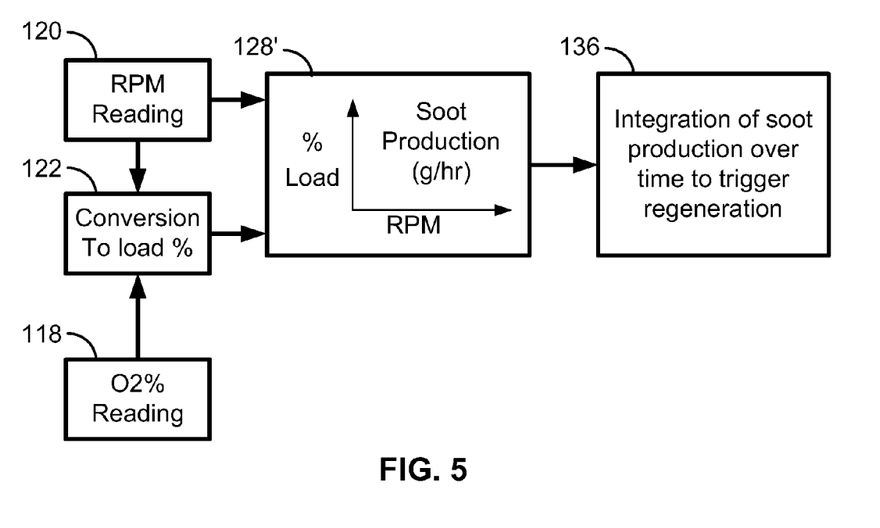
FIG. 5 is a simplified flow diagram illustrating calculation of instantaneous soot production rate based on oxygen percentage and engine speed utilized in an embodiment of an after treatment controller constructed in accordance with the teachings of the present invention.

As illustrated by the graphical illustration of FIG. 3, it may also be seen that the oxygen percentage sensed by oxygen sensor 110 (see FIG. 1) may also be related to soot production, i.e., soot density in the exhaust, as will be discussed more fully below with regard to FIGS. 5 and 6.

Figure 4:
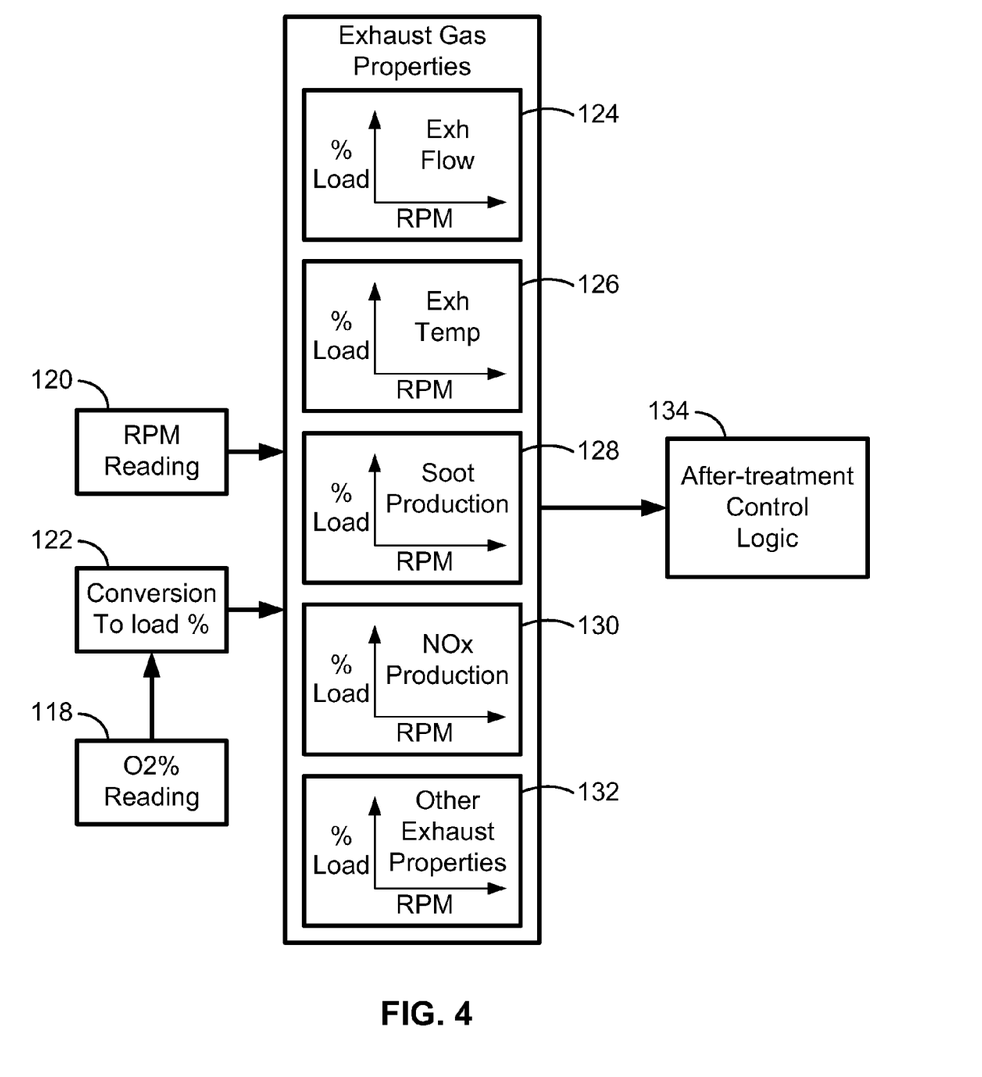
FIG. 4 is a simplified flow chart illustrating conversion from a sensed oxygen percentage signal and from the engine speed information to exhaust composition data for use in an embodiment of an after treatment controller of the regeneration control system of the present invention.

As may be seen from the simplified flow chart of FIG. 4, by utilizing the oxygen percentage reading 118 (from the wide band oxygen sensor 110 illustrated in FIG. 1) and the engine speed reading 120 (from the engine speed sensor 112 shown in FIG. 1), the aftertreatment controller 108 (see FIG. 1) can determine the exhaust composition data that may then be used to control the regeneration device. Specifically, the oxygen percentage reading 118 is first converted to percentage load at block 122 as discussed above. In other embodiments, however, the oxygen percentage reading 118 may be used as the y-axis directly without conversion to percentage load. In this way, the aftertreatment controller may use the oxygen percentage reading 118 and the engine speed reading 120 directly to determine the exhaust composition data based on the measured or simulated relationship between these two and the exhaust composition data of interest.

Once the percentage load of the diesel engine is calculated, the engine speed reading 120 is utilized to determine each of the individual exhaust composition data to be used to control the regeneration device 106. This may be done, as shown in FIG. 4, by storing empirical relationship data for the particular diesel engine or class of diesel engines for which regeneration is desired. As an example, the empirical relationship of exhaust flow (volume in m$^3$/hr) to percent engine load and engine speed may be stored or calculated by module 124 based on simulation or actual testing data. Similarly, the exhaust temperature may be determined via module 126, soot production via module 128, $NO_x$ production via module 130, and any other exhaust parameter of interest via module 132. In one embodiment, each of modules 124-132 utilize a look up table relating the percentage load and engine speed to the particular exhaust composition data determined from empirical testing or simulation of the system 100 for which the after treatment controller 108 will be utilized.

Once the various exhaust composition data are determined, the after treatment control logic 134 utilizes this information to control the regeneration device using algorithms known in the art. For example, if the regeneration device 106 utilizes a combustor, the control of this combustor utilizes the oxygen percentage information to determine airflow, exhaust flow, and exhaust temperature to calculate the fuel requirement for achieving a desired thermal profile to properly control the regeneration event of the diesel particulate filter 102 utilizing known techniques. In other words, prior controlled methods that relied upon CAN bus data from the ECU and from various sensors in the exhaust system may still be utilized even though such CAN bus data, sensor signals, and other fuel rack information is not provided to the after treatment controller 108 because such information may be determined based upon the oxygen percentage reading 118 and the speed reading 120.

In addition to properly controlling the regeneration event, the after treatment controller 108 must also determine an initiation point to begin regeneration. As discussed above, initiating regeneration too soon or too late both pose significant issues in an exhaust system. In one embodiment, as shown in FIG. 5, the oxygen percentage reading 118 is converted to the engine load percentage in module 122 as discussed above. The engine speed reading 120 is then used in the soot production module 128' to determine the soot production rate (e.g., in grams per hour). As discussed above, this relationship between percentage load, engine speed, and soot production rate may be based upon empirical or simulated data for the particular diesel engine 104 or class of diesel engines for which this system is to be installed. Once the soot production rate has been determined, this information is integrated over time in module 136 to trigger the regeneration event. That is, once the amount of soot deposited in the diesel particulate filter 102 as calculated in module 136 exceeds a predetermined limit, the after treatment controller 108 initiates the regeneration event.

Figure 6:
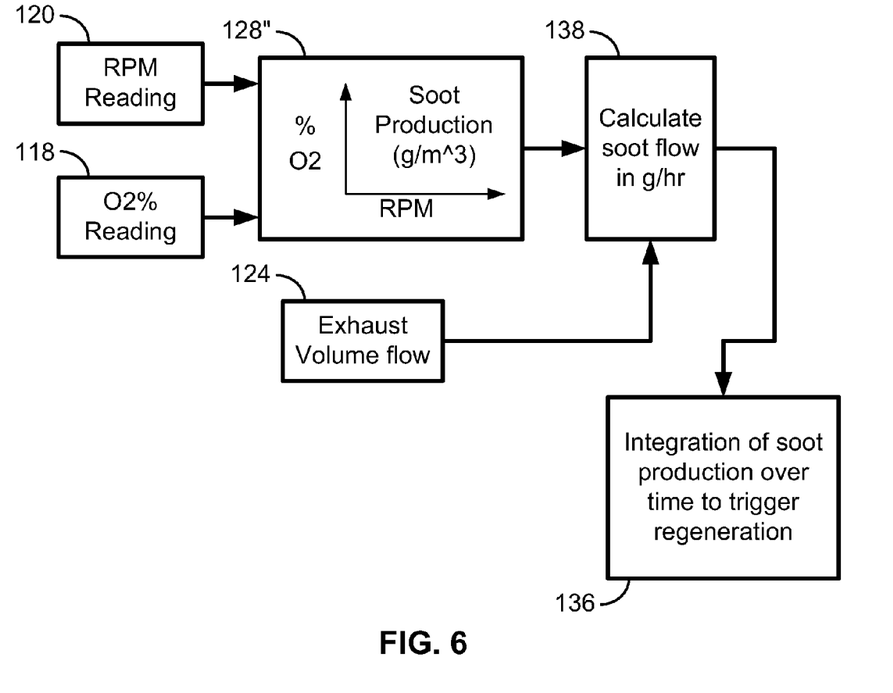
FIG. 6 is a simplified flow diagram illustrating calculation of soot production rate based on the sensed oxygen percentage and engine speed utilized in an embodiment of an after treatment controller constructed in accordance with the teachings of the present invention.

This initiation of the regeneration event may also be calculated in an alternative embodiment in accordance with the flow diagram of FIG. 6. As shown, the oxygen percentage reading 118 and the engine speed reading 120 are used directly in module 128" to determine the soot production as a soot density, (e.g., g/m$^3$). This information, along with the exhaust volume flow in cubic meters per hour from module 124 (see FIG. 4) are used in module 138 to calculate the soot flow in grams per hour. Once this soot flow in grams per hour is calculated, module 136 may again be used to integrate the soot production over time to trigger the regeneration as discussed above.

Figure 7:
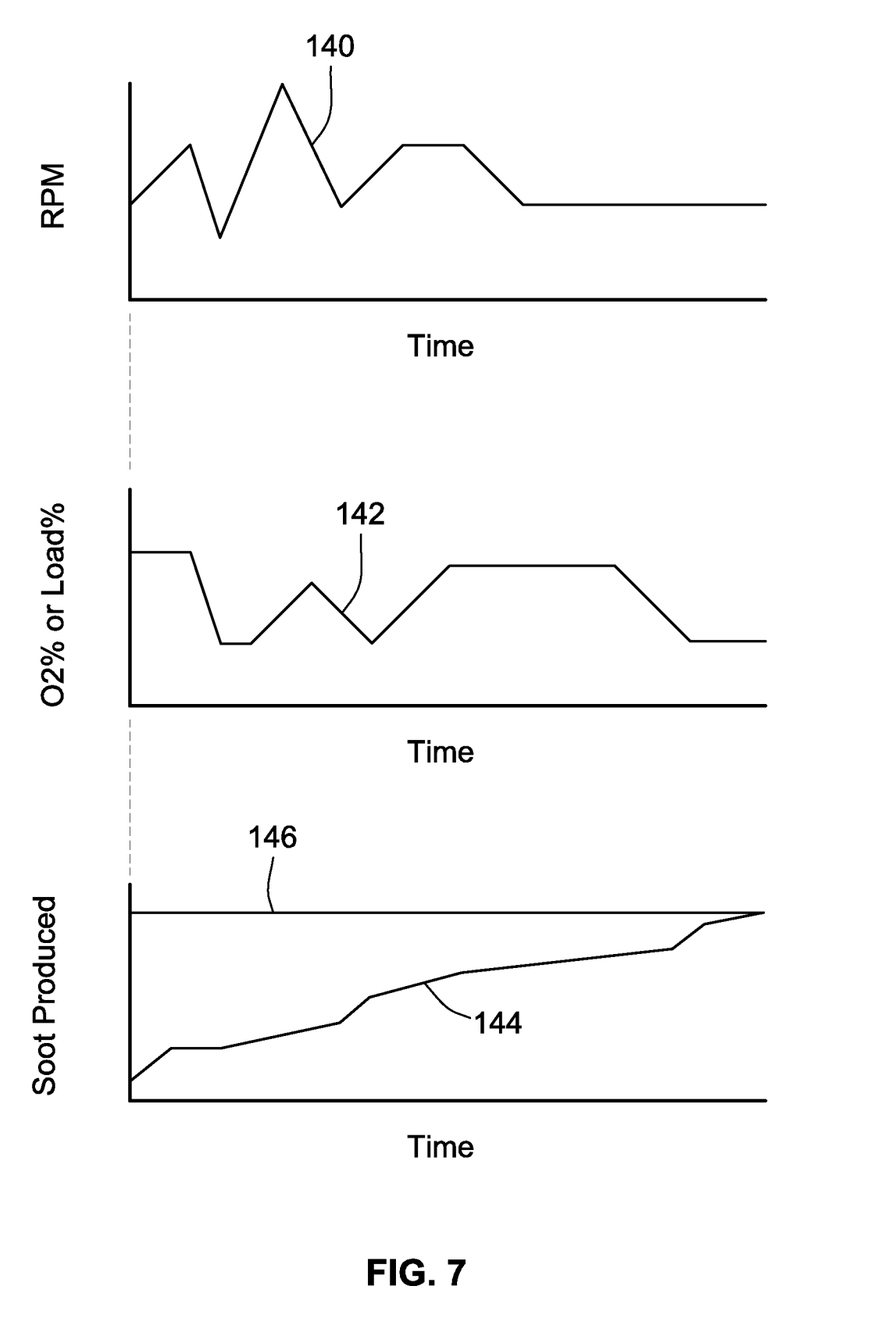
FIG. 7 is a graphical illustration showing a relationship between engine speed, oxygen percentage, and total soot loading illustrating initiation of the regeneration process.

FIG. 7 provides a simplified illustration to help understand the initiation of the regeneration process as discussed above. As shown, both the engine speed (see trace 140) and oxygen percentage or engine load percentage (see trace 142) may vary over the operating time between regeneration events. Because of the changing operating conditions of the diesel engine, the rate at which the soot is produced will also vary over time as shown by trace 144. However, through the integration performed by module 136 of FIGS. 5 and 6, the total soot produced during this operating period will be accumulated until it is determined that the amount of soot produced meets or exceeds a predetermined threshold (see trace 146) at which regeneration should be initiated. In this way, efficient initiation of regeneration can be ensured.

Figure 8:
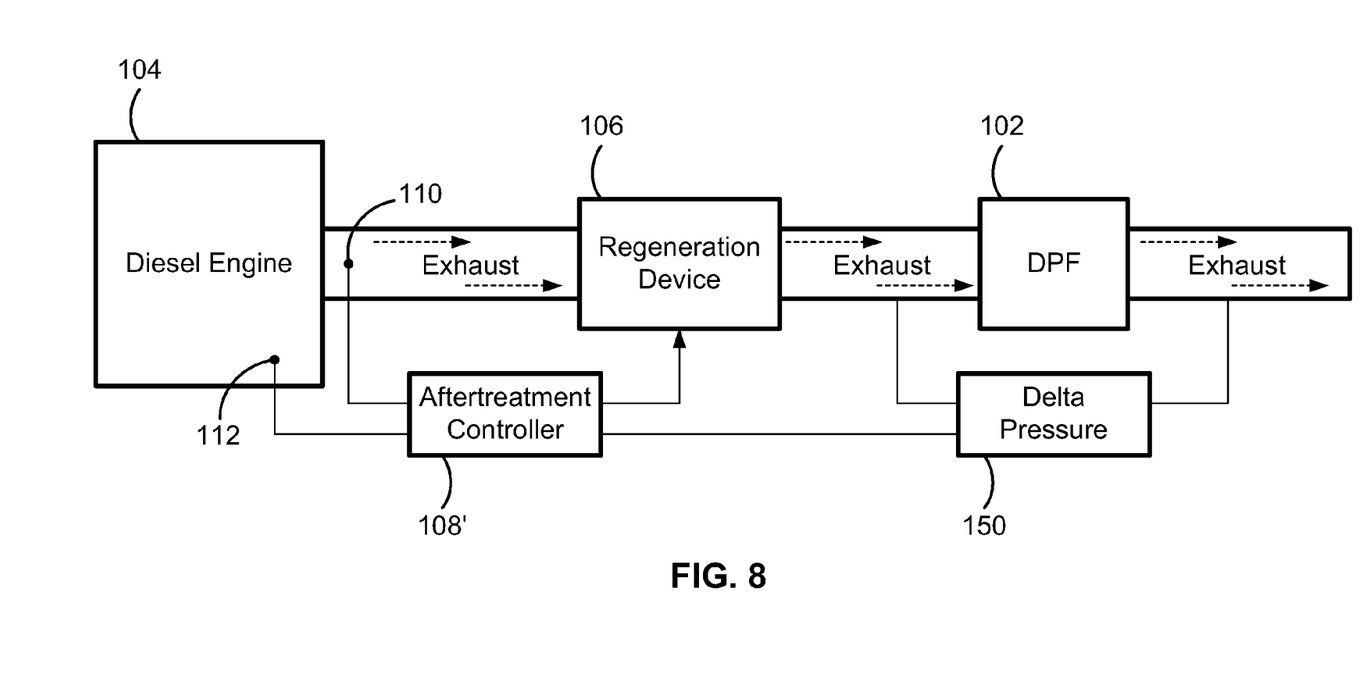
FIG. 8 is a simplified schematic illustration of a diesel engine exhaust system including a diesel particulate filter, delta pressure sensors, and an alternate embodiment of a regeneration control system constructed in accordance with the teachings of the present invention.

FIG. 8 illustrates an alternate embodiment of the present invention that includes an input in the aftertreatment controller 108' from a delta pressure sensor 150 across the DPF 102, i.e. from pressure readings upstream and downstream of the DPF 102. In this embodiment, the method for triggering a regeneration is based on estimating the soot load in the DPF 102 by measuring a delta pressure across the DPF 102.

Figure 9:
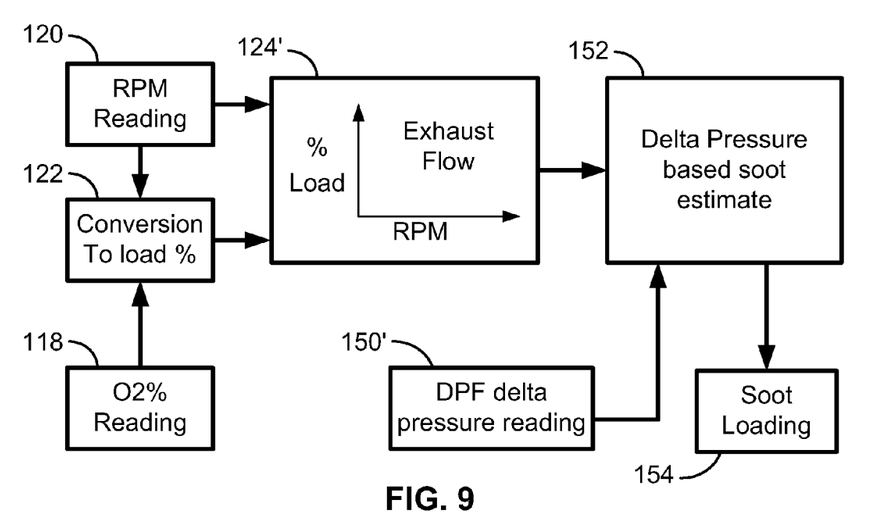
FIG. 9 is a simplified flow diagram illustrating calculation of soot loading based on the sensed oxygen percentage and engine speed utilized in an embodiment of an after treatment controller constructed in accordance with the teachings of the present invention.

As shown in FIG. 9, the oxygen sensor reading of $O_2\%$ 118 is used along with the engine speed reading 120 (with or without conversion to load percentage 122 as discussed above) in the exhaust flow module 124' to determine the exhaust flow to the DPF 102 (see FIG. 8). This information along with the DPF delta pressure reading 150' are used by module 152 to determine a delta pressure-based soot estimate, which is compared to the soot loading threshold in module 154 to initiate regeneration. Module 152 utilizes the exhaust flow rate in conjunction with a delta pressure measurement to estimate a soot load through a model, a relationship based on empirical data, or table of such data relating exhaust flow, delta pressure, and soot loading of a DPF. As discussed above, this relationship may be based upon empirical or simulated data for the particular diesel engine 104 or class of diesel engines for which this system is to be installed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A regeneration control system for use with a diesel engine having a diesel particulate filter (DPF) in an exhaust system, a regeneration device positioned upstream of the DPF in the exhaust system, a wide band oxygen sensor positioned upstream of the regeneration device in the exhaust system for sensing a percentage of oxygen ($O_2\%$) in an exhaust from the diesel engine, and an engine speed sensor operably coupled to the diesel engine, comprising:
an aftertreatment controller operably coupled to the wide band oxygen sensor for receiving $O_2\%$ information therefrom, and to the engine speed sensor for receiving engine speed information therefrom, the aftertreatment controller programmed to initiate regeneration based on the $O_2\%$ information and the engine speed information; and
wherein the aftertreatment controller is programmed to determine total soot production from the $O_2\%$ information and from the engine speed information, the aftertreatment controller initiating regeneration when the total soot production exceeds a predetermined threshold.

2. The regeneration control system of claim 1, wherein the aftertreatment controller utilizes a linear approximation to determine engine load from the $O_2\%$ information, an empirical relationship between engine load and engine speed to determine instantaneous soot production, and wherein the aftertreatment controller integrates the instantaneous soot production over time to determine the total soot production to compare to the predetermined threshold to initiate regeneration.

3. The regeneration control system of claim 1, wherein the aftertreatment controller utilizes an empirical relationship between the $O_2\%$ and the engine speed information to determine soot density production, a linear approximation to determine engine load from the $O_2\%$ information, an empirical relationship between the engine load and the engine speed information to determine exhaust volume flow, wherein the aftertreatment controller calculates instantaneous soot production from the soot density production and the exhaust volume flow; and wherein the aftertreatment controller integrates the instantaneous soot production over time to determine the total soot production to compare to the predetermined threshold to initiate regeneration.

4. The regeneration control system of claim 1, wherein the aftertreatment controller utilizes an empirical relationship based on the $O_2\%$ information to determine the engine load, an empirical relationship between engine load and engine speed to determine instantaneous soot production, and wherein the aftertreatment controller integrates the instantaneous soot production over time to determine the total soot production to compare to the predetermined threshold to initiate regeneration.

5. The regeneration control system of claim 1, wherein the aftertreatment controller utilizes an empirical relationship between the $O_2\%$ and the engine speed information to determine soot density production, an empirical relationship based on the $O_2\%$ information to determine the engine load, an empirical relationship between the engine load and the engine speed information to determine exhaust volume flow, wherein the aftertreatment controller calculates instantaneous soot production from the soot density production and the exhaust volume flow; and wherein the aftertreatment controller integrates the instantaneous soot production over time to determine the total soot production to compare to the predetermined threshold to initiate regeneration.

6. The regeneration control system of claim 1, wherein the aftertreatment controller utilizes a relationship based on the $O_2\%$ information to determine the engine load, a relationship between engine load and engine speed to determine instantaneous soot production, and wherein the aftertreatment controller integrates the instantaneous soot production over time to determine the total soot production to compare to the predetermined threshold to initiate regeneration.

7. The regeneration control system of claim 1, wherein the aftertreatment controller utilizes a relationship between the $O_2\%$ and the engine speed information to determine soot density production, a relationship based on the $O_2\%$ information to determine the engine load, a relationship between the engine load and the engine speed information to determine exhaust volume flow, wherein the aftertreatment controller calculates instantaneous soot production from the soot density production and the exhaust volume flow; and wherein the aftertreatment controller integrates the instantaneous soot production over time to determine the total soot production to compare to the predetermined threshold to initiate regeneration.

8. A regeneration control system for use with a diesel engine having a diesel particulate filter (DPF) in an exhaust system, a regeneration device positioned upstream of the DPF in the exhaust system, a wide band oxygen sensor positioned upstream of the regeneration device in the exhaust system for sensing a percentage of oxygen $O_2\%$) in an exhaust from the diesel engine, an engine speed sensor operably coupled to the diesel engine. and a delta pressure sensor positioned to monitor a delta pressure across the DPF, comprising:
    an aftertreatment controller operably coupled to the wide band oxygen sensor for receiving $O_2\%$ information therefrom, and to the engine speed sensor for receiving engine speed information therefrom, the aftertreatment controller programmed to initiate regeneration based on the $O_2\%$ information and the engine speed information; and
    wherein the aftertreatment controller is programmed to determine total soot loading from the $O_2\%$ information, from the engine speed information, and from the delta pressure across the DPF, the aftertreatment controller initiating regeneration when the total soot loading exceeds a predetermined threshold.

9. A method of initiating regeneration of a diesel particulate filter (DPF) in an exhaust system of a diesel engine having a regeneration device positioned upstream of the DPF in the exhaust system. a wide band oxygen sensor positioned upstream of the regeneration device in the exhaust system for sensing a percentage of oxygen ($O_2\%$) in an exhaust from the diesel engine, and an engine speed sensor operably coupled to the diesel engine to provide engine speed information, comprising the steps of:
    initiating regeneration based on the $O_2\%$ information and the engine speed information;
    wherein the step of initiating regeneration includes the steps of:
    determining total soot production from the $O_2\%$ information and from the engine speed information; and
    initiating regeneration when the total soot production exceeds a predetermined threshold.

10. The method of claim 9, wherein the step of determining total soot production includes the steps of:
    utilizing a linear approximation to determine engine load from the $O_2\%$ information;
    utilizing an empirical relationship between engine load and engine speed to determine instantaneous soot production; and
    integrating the instantaneous soot production over time to determine the total soot production.

11. The method of claim 9, wherein the step of determining total soot production includes the steps of:
    utilizing an empirical relationship between the $O_2\%$ and the engine speed information to determine soot density production;
    utilizing a linear approximation to determine engine load from the $O_2\%$ information; utilizing an empirical relationship between the engine load and the engine speed information to determine exhaust volume flow;
    calculating instantaneous soot production from the soot density production and the exhaust volume flow; and
    integrating the instantaneous soot production over time to determine the total soot production.

12. The method of claim 9, wherein the step of determining total soot production includes the steps of:
    utilizing an empirical relationship based on the $O_2\%$ information to determine the engine load;
    utilizing an empirical relationship between engine load and engine speed to determine instantaneous soot production; and
    integrating the instantaneous soot production over time to determine the total soot production.

13. The method of claim 9, wherein the step of determining total soot production includes the steps of:
    utilizing an empirical relationship between the $O_2\%$ and the engine speed information to determine soot density production;
    utilizing an empirical relationship based on the $O_2\%$ information to determine the engine load;
    utilizing an empirical relationship between the engine load and the engine speed information to determine exhaust volume flow;
    calculating instantaneous soot production from the soot density production and the exhaust volume flow; and
    integrating the instantaneous soot production over time to determine the total soot production.

14. The method of claim 9, wherein the step of determining total soot production includes the steps of:
    utilizing a relationship based on the $O_2\%$ information to determine the engine load;
    utilizing a relationship between engine load and engine speed to determine instantaneous soot production; and
    integrating the instantaneous soot production over time to determine the total soot production.

15. The method of claim 9, wherein the step of determining total soot production includes the steps of:

utilizing a relationship between the $O_2$% and the engine speed information to determine soot density production;

utilizing a relationship based on the $O_2$% information to determine the engine load;

utilizing a relationship between the engine load and the engine speed information to determine exhaust volume flow;

calculating instantaneous soot production from the soot density production and the exhaust volume flow; and integrating the instantaneous soot production over time to determine the total soot production.

16. The method of claim 9, further comprising the steps of:
operating the diesel engine at various engine loads;
monitoring the $O_2$% information at each of the various loads;
developing an empirical relationship between the $O_2$% information and the various engine loads.

17. The method of claim 9, further comprising the steps of:
operating a simulation of the diesel engine at various engine loads;
monitoring simulated $O_2$% information at each of the various loads;
developing a relationship between the $O_2$% information and the various engine loads from the simulation.

18. The method of claim 9, wherein the diesel engine belongs to a first class of diesel engines, further comprising the steps of:

operating a standard diesel engine from the first class of diesel engines at various engine loads;
monitoring $O_2$% information at each of the various loads for the standard diesel engine;
developing an empirical relationship between the $O_2$% information and the various engine loads for the first class of diesel engines to be applied to engines in the first class.

19. The method of claim 18, further comprising the steps of:

operating the standard diesel engine from the first class of diesel engines at various engine speeds;
monitoring an exhaust gas property at each of the various loads and engine speeds;
developing an empirical relationship relating the exhaust gas property to the various engine loads and engine speeds for the first class of diesel engines to be applied to engines in the first class.

20. The method of claim 9, further comprising the step of receiving delta pressure information from a delta pressure sensor operably coupled across the DPF, and wherein the step of initiating regeneration based on the $O_2$% information and the engine speed information comprises the step of initiating regeneration based on the $O_2$% information, the engine speed information, and the delta pressure information.

* * * * *

UNITED STATES PATENT AND TRADEMARK OFFICE
CERTIFICATE OF CORRECTION

PATENT NO.       : 8,484,956 B2                    Page 1 of 1
APPLICATION NO.  : 13/023040
DATED            : July 16, 2013
INVENTOR(S)      : Mastbergen It is certified that error appears in the above-identified patent and that said Letters Patent is hereby corrected as shown below:

In the Claims

Claim 9
Column 9, line 65, the "." after the word "system" should be a --,-- such that the line reads
--exhaust system, a wide band oxygen sensor positioned--

Signed and Sealed this
Seventeenth Day of September, 2013

Teresa Stanek Rea
*Deputy Director of the United States Patent and Trademark Office*